United States Patent [19]

Krauch et al.

[11] 3,955,920
[45] May 11, 1976

[54] WASHING PROCESS WITH ACID MONOMER GRAFTED CELLULOSE FABRIC IN BATH TO ABSORB METAL CATIONS HARDENING WATER

[75] Inventors: Carl Heinrich Krauch, Neuss; Axel Sanner, Ludwigshafen; Guenter Jakobi, Hilden; Edmund Schmadel, Mettmann, all of Germany

[73] Assignee: Henkel & Cie G.m.b.H., Dusseldorf, Germany

[22] Filed: Mar. 30, 1973

[21] Appl. No.: 346,626

[30] Foreign Application Priority Data

Mar. 30, 1972  Switzerland.......................... 4825/72

[52] U.S. Cl.......................................... 8/137; 8/142; 252/90
[51] Int. Cl.² ........................................ D06L 1/12
[58] Field of Search.............................. 8/137, 142; 252/90–94, 134, 174, 176, 179

[56] References Cited

UNITED STATES PATENTS

| 3,424,545 | 1/1969 | Baumann et al........................ 8/137 |
| 3,607,692 | 9/1971 | Sanner............................ 204/159.12 |
| 3,650,673 | 3/1972 | Ehner ................................... 8/137 |

FOREIGN PATENTS OR APPLICATIONS

| 1,235,146 | 6/1971 | United Kingdom................... 8/137 |

OTHER PUBLICATIONS

Peper et al., American Dyestuff Reporter, pp. 36–42.

*Primary Examiner*—Donald Levy
*Attorney, Agent, or Firm*—Johnston, Keil, Thompson & Shurtleff

[57] ABSTRACT

Process for washing textiles in which the washing treatment is carried out in the presence of a cation exchanger containing carboxyl groups in the form of alkali salts and capable of removing calcium and magnesium ions from the washing liquor, and a washing agent for use in said process.

5 Claims, No Drawings

WASHING PROCESS WITH ACID MONOMER GRAFTED CELLULOSE FABRIC IN BATH TO ABSORB METAL CATIONS HARDENING WATER

This invention relates to a washing process utilizing ion exchangers during the washing treatment, which ion exchangers are capable of removing calcium and magnesium ions from the wash water.

It is known that domestic detergents and cleansing agents frequently contain large amounts of condensed phosphates, particularly triphosphates. The purpose of such phosphates is to form a complex with the hardness salts in tap water and to improve to cleansing action of the capillary-active detergent substances. However, it is widely held that the phosphates passing to rivers and lakes with the waste water contribute to eutrophication of these waters supporting the growth of algae and resulting in depletion of oxygen. It is thus desirable to remove the phosphates from the detergents or at least reduce the content thereof considerably.

Previously proposed exchanger materials, for example strong alkalis, niitrogenous sequestering agents and polyanionic polymers, suffer from a number of disadvantages, i.e. they may show insufficient washing activity, they may change the pH of the waste water, they may be incapable of biological degradation or they may themselves play a role in eutrophication. The possibility of softening the tap water used for washing purposes by means of ion exchangers, as is frequently done in laundries, usually cannot be considered in private households on account of the cost involved. Furthermore, such a solution would not seem to be entirely satisfactory in any case, as considerable amounts of salt pass to the waste water when the exchangers are regenerated.

German Published Application 1,167,058 proposes that water used for washing may be softened by the use of water-insoluble cellulose derivatives, in particular cotton treated with olefinic phosphoranes. However, this does not solve the problem, since the disposal of such auxiliaries, for example by burning, again producers phosphates. The other cellulose derivatives mentioned in said application, namely sulfethoxy cellulose, carboxymethy cellulose and the succinic acid half-ester of cellulose, are capable of binding calcium only to a slight degree and are thus unlikely to be seriously considered for general use.

It is an object of the invention to provide a washing process which does not involve environmental pollution, in which the above drawbacks do not arise and, in particular, the waste water is not polluted with phosphate or additional amounts of other inorganic salts or organic material.

The above object is achieved by a process for washing textiles carried out in the presence of a water-insoluble free cation exchanger, wherein the washing treatment is carried out in the presence of a poromeric material as cation exchanger, said material having been prepared by a. impregnating a fibrous web structure with a liquid containing
  ($\alpha$) polyethylenically unsaturated monomers having at least 2 double bonds or mixtures of at least 0.1% w/w of such polyethylenically unsaturated monomers with monoethylenically unsaturated copolymerizable monomers and, optionally, polymers, or
  ($\beta$) monoethylenically unsaturated polymerizable monomers and polymers having molecular weights of more 10,000, in solution or dispersion,
b. cooling the resulting structure so that at least 50% w/w of the liquid freezes,
c. irradiating the solidified structure with electromagnetic radiation having a wavelength of less than 0.70 $\mu$m or with electron beams to cause polymerization of the monomers,
d. causing the liquid in the solidified structure to melt,
e. separating the resulting poromeric material from the liquid and optionally washing and drying said material, said poromeric material containing at least 1 milli-equivalent/g of carboxyl groups in the form of alkali metal or ammonium salts.

By poromeric materials we mean materials having a fibrous to porous structure and absorbent properties, as prepared by the measures stated above. As the amount of polyunsaturated monomers in the monomer solutions or dispersion increases, the poromeric materials have a more fibrous character, whilst the porous character tends to predominate under reverse conditions.

It is important for the poromeric materials used to have a content of carboxyl groups of at least 1 and in particular of at least 2.5 milli-equivalents/g based on the total weight of the dry poromeric material. It is advantageous for this content of carboxyl groups to be between 2.5 and 8 mg-equivalents/g.

For the sake of simplicity, the following description of the preparation of the poromeric materials speaks merely of carboxyl groups. It is important, however, that these groups be in the form of alkali salts (including ammonium salts), particularly in the form of sodium or potassium salts, before the poromeric material is used in the washing process. The poromeric materials may be prepared in such a way that they initially carry carboxyl groups which may then be neutralized with appropriate bases to form the salts, e.g. they can be neutralized with from 1 to 10% w/w solutions of the hydroxides or carbonates of alkali metals or ammonium. Alternately, the poromeric materials may be made with the use of appropriate monomers or polymers already carrying carboxylate groups, for example sodium acrylate in an aqueous system.

We have found that not all existing carboxylic groups are capable of binding hardness salts which may be present in a washing process. In practice, only those poromeric materials are suitable which are capable of binding calcium in an amount of at least 20 and in particular of at least 40 mg CaO/g. Determination of the calcium-binding power may be carried out by placing about 1 g of the poromeric material in salt in 1 l of neutralized water having an initial hardness of 20° German scale (200 mg CaO/l) at a temperature of 25°C and, after a period of 2 hours with constant agitation, back-titrating the residual hardness of the water in the usual manner.

The carboxyl or carboxylate groups may be introduced into the poromeric materials via the monomers selected or by including carboxyl group-containing polymers. Poromeric materials containing from about 20 to 70% and in particular from 30 to 60% w/w of polymerized acrylic acid units have been found to give satisfactory results, the said acrylic acid units arising either from the use of monomeric acrylic acid or from the use of polyacrylic acid or acrylic acid pololymers when preparing said poromeric materials.

Instead of acrylic acid units, the required carboxyl groups may be introduced into the poromeric materials via other polymerizable unsaturated carboxylic acids, particularly those having from 3 to 5 carbon atoms such as methacrylic acid or maleic acid.

It is convenient to apply the fibrous web structure and the monomer solution or dispersion to a substrate capable of being cooled. The application of the web and liquid maytake place simultaneously or in succession, a successful method being to apply the fibrous web structure which has previously been treated with a monomer solution or dispersion, for example by dipping, spraying or sprinkling techniques. The substrate may be a roll or an endless belt, an endless steel belt being particularly suitable.

The proportion of fibrous web structure in the finished poromeric material should be from about 20 to 60% and in particular from 30 to 50% by weight. The main purpose of the web of textile material is to provide mechanical reinforcement.

Particularly suitable webs of textile material are nonwoven fabrics of natural or synthetic fibers or filaments, which may have been needle-punched in the usual manner. Other suitable materials are knitted or woven materials of natural or synthetic fibers or filaments which have preferably been strongly napped. The fibers or filaments may be, say, conventional wool, cellulose, cellulose acetate, viscose, polypropylene, polyamide (e.g. nylon 6 or nylon 6.6), polyacrylonitrile and/or polyethylene terephthalate fibers or filaments.

The liquids in which the monomers and, possibly, polymers are dissolved or dispersed conveniently have freezing points between 50°C and −25°C. Thus it is possible to use liquids which are solid at room temperature. Suitable liquids are glacial acetic acid, dioxane, cyclohexane, ethylene carbonate and, preferably, water.

By cooling, heat is removed from the applied solution or dispersion of monomers to such an extent that it freezes either substantially completely or at least to a degree of about 50% by weight. The solified crystalline structure on the substrate is then irradiated with electromagnetic radiation or with electron beams to cause polymerization of the monomers.

Cooling may be effected in conventional manner, for example by contact cooling, a satisfactory method being the spraying of the underside of the substrate with a cold liquid such as a salt solution or, advantageously, cooling brine, or with cold methanol or a cold glycol/water mixture.

The degree to which the fibrous web structure is embedded in the desired poromeric materials may be varied, for example by varying the amount of monomers of polymers used or by pressing said fibrous structure to a greater or lesser extent during the freezing process.

The thickness of the frozen assembly is conveniently from 0.5 to 20 mm and in particular from 1.0 to 10 mm.

Apart from the carboxyl group-bearing monomers, other polyethylenically unsaturated monomers suitable for our new process are those having at least 2 double bonds which can be polymerized by free radicals. Such free radical polymerization is initiated by electromagnetic irradiation or by irradiation with electron beams, optionally in the presence of photoinitiators. Examples of suitable monomers are polyolefinically unsaturated carboxylic acid esters, e.g. diesters of aliphatic or cycloalkphatic diols having preferably from 2 to 10 carbon atoms and in particular from 2 to 6 carbon atoms, such as ethylene glycol, propylene glycol, butanediol-1,4, hexanediol-1,6 and cyclohexanediol-1,4, with monoethylenically unsaturated monocarboxylic acids of from 3 to 5 carbon atoms such as, in particular, acrylic and methacrylic acids, e.g. ethylene glycol diacrylate, ethylene glycol dimethacrylate, butanediol-1,4 diacrylate, butanediol-1,4, dimethylacrylate, hexanediol-1,6, diacrylate and cyclohexanediol-1,4 diacrylate; and also polyfunctional vinyl esters of polycarboxylic acids, in particular divinyl esters of aliphatic or aromatic dicarboxylic acids preferably containing from 4 to 8 carbon atoms and optionally having one olefinic double bond, such as divinyl oxalate, divinyl maleate and divinyl fumarate, vinyl esters of monoolefinically unsaturated monocarboxylic acids preferably containing 3 or 5 carbon atoms, such as vinyl methacrylate, vinyl crotonate and, preferably, vinyl acrylate, allyl carboxylic acid esters, particularly of saturated or monoolefinically unsaturated dicarboxylic acids containing from 3 to 8 carbon atoms, such as diallyl phthalate, allyl acrylate, allyl methacrylate, diallyl maleate, diallyl oxalate and diallyl adipate. Such unsaturated carboxylic acid esters usually have two or three olefinic double bonds and from 5 to 20 and in particular from 5 to 14 carbon atoms and may, if desired, be derived from substituted carboxylic acids.

Other suitable polyolefinically unsaturated monomers are polyolefinically unsaturated carboxamides, e.g. methylene bis-acrylamide and diamides of acrylic and methacrylic acids with diamines, particularly $C_{2-6}$ aliphatic diamines such as N,N'-ethylene-bis-acrylamide, N,N'-ethylene-bis-methacrylamide and N,N'-hexamethylene-bis-acrylamide, and diethers of aliphatic or cycloaliphatic diols containing preferably from 2 to 10 and in particular from 1 to 6 carbon atoms, such as ethylene glycol and butanediol-1,4, and N-methylol acrylamide and N-methylol methacrylamide.

Polyolefinically unsaturated monomers containing at least two polymerizable double bonds which may be used are the so-called "unsaturated polyesters" which form usual components in the manufacture of so-called unsaturated polyester resins.

In place of polyethylenically unsaturated monomers alone, mixtures of monomers may be used which contain at least 0.1% and preferably at least 0.5% and more preferably at least 5% by weight of such monomers in admixture with monethylenically unsaturated monomers capable of copolymerization with the polyethylenically unsaturated monomers by free-radical polymerization. It is particularly advantageous to use acrylic acid in such an amount that the finished poromeric materials finally contain from 20 to 70% by weight of polymerized acrylic acid units.

Apart from carboxylic group bearing monomers, suitable monoethylenically unsaturated monomers for use in the present invention are, in particular, acrylates and/or methacrylates of alkanols of from 1 to 8 and in particular of from 1 to 4 carbon atoms, and also acrylates and/or methacrylates of cycloalkanols having 5 or 6 carbon atoms in the ring or of polyhydric, particularly di- or tri-hydric, alcohols of from 2 to 6 carbon atoms, also acrylamides and/or methacrylamides or their N-methylol compounds or their N-methylol ethers of alcohols of from 1 to 4 carbon atoms. As examples of particularly suitable monomers of this type there may mentioned the methy, ethyl, n-propyl, n-butyl, isobutyl, t-butyl, n-hexyl, cyclohexyl and 2-ethylhexyl esters of acrylic and methacrylic acids, 2-hydroxyethyl acrylate, 1,4-butanediol monoacrylate, acrylamide, methacrylamide, N-methylol acrylamide, N-methylol methacrylamide and N-methylol methacrylamide n-butyl ether. These monomers may also be used in admixture with each other, to advantage.

Monoethylenically unsaturated monomers which are also suitable, particularly in admixture with the above monomers, are vinyl esters of aliphatic monocarboxylic acids of from 2 to 18 carbon atoms, such as vinyl acetate, vinyl propionate, vinyl n-butyrate, vinyl laurate and vinyl stearate, also vinyl ethers of alcohols of from 4 to 8 carbon atoms, such as vinyl isobutyl ether and vinyl n-octyl ether, also N-vinyl compounds, such as N-vinyl pyrrolidone and N-vinyl carbazole, also vinyl thioethers, such as 1-vinyl thioethanol.

If the monomer solutions or dipersions also contain polymers, as described below, there is no need to use polyunsaturated monomers and the process may be carried out with monoethylenically unsaturated monomers only.

The concentration of monomers in the monomer solutions or dispersions may vary within wide limits. It is generally between 1 and 30% and preferably between 2 and 15% by weight based on the solution or dispersion.

By dispersion we mean a fine distribution of a substance in a liquid irrespective of whether said substance is in a solid or liquid form. Thus the term monomer dispersion also embraces a monomer emulsion.

The dispersions may be prepared by conventional methods. Dispersion in aqueous medium may be effected using conventional dispersing agents and optionally protective colloids. Such dispersing agents are described, for example, in Houben-Weyl "Methoden der organischen Chemie" Vol. XIV/1, "Makromolekulare Stoffe", Georg Thieme Verlag, Stuttgart, 1961, especially pp. 192–208. Examples of suitable dispersing agents are those of the anionic type such as the alkali metal salts of fatty acids, alkali metal salts of acidic fatty alcohol sulfuric acid esters, particularly sodium sulfonates for example, alkali metal and ammonium salts of alkyl and alkylaryl sulfonic acids, salts of fatty acid condensation products with oxyalkylcarboxylic acids, aminoalkylcarboxylic acids and, in particular, alkali metal salts of sulfonate adducts of ethylene and fatty alcohols or alkyl phenols, which adducts contain for example from 5 to 30 and in particular from 8 to 20 ethylene oxide radicals, and also cationic dispersing agents, such as salts of alkyl amines, aryl, alkylaryl and resin amines and salts of quaternary compounds, such as N-dodecyl-N-trimethylammonium chloride. It is also possible to use non-ionic dispersing agents, for example the reaction products of alkylene oxides, particularly ethylene oxide, with fatty alcohols, fatty acids or alkylphenols containing preferably $C_{8-12}$ alkyl radicals. Further, it is possible to use mixtures of dispersing agents in our process, for example mixtures of non-ionic and anionic dispersing agents. The concentration of dispersing agents of the above kinds is generally between 0.1 and 10 % and preferably between 0.1 and 5% by weight, based on the total dispersion. In special cases, it may also be possible to operate without added dispersing agent.

As mentioned above, the monomer solutions or dispersions may contain polymers.

Suitable polymers, which usually have molecular weights of more than 10,000, are all synthetic polymers as may be prepared by conventional polymerization and polycondensation methods, provided they are soluble or dispersible in the liquid used and, possibly, are manufactured in a dissolved or dispersed state. Suitable polymers are for example homo- and/or co-polymers of monoethylenically and diethylenically unsaturated monomers, for example of mono- or di-olefins having preferably from 2 to 5 carbon atoms, such as ethylene, propylene, isobutylene, butadiene and isoprene, such as derivatives of $\alpha,\beta$-ethylenically unsaturated mono- and di-carboxylic acids, particularly those having from 3 to 5 carbon atoms, such as acrylic acid, methacrylic acid, maleic acid, and itaconic acid, e.g. unsubstituted or substituted amides, nitriles and/or ester, particularly with $C_{1-8}$ alkanols, such as methyl, ethyl, propyl, n-butyl, t-butyl, n-hexyl and 2-ethylhexyl esters of acrylic and methacrylic acids and diethyl maleate and di-n-butyl maleate, acrylamide, methacrylaamide and N-n-butoxymethyl acrylamide, acrylonitrile, methacrylonitrile, of vinyl aromatic monomers which, like styrene $\alpha$-methylstyrene, divinylbenzene and vinyltoluenes, generally have only one benzene nucleus, of vinyl esters of generally $C_{2-12}$ monocarboxylic acids, such as, in particular, vinyl acetate, vinyl propionate, vinyl butyrate and vinyl laurate, of vinyl ethers, particularly of $C_{1-4}$ alkanols, such as vinyl methyl ehter and vinyl isobutyl ether, heterocyclic vinyl compounds, such as vinyl pyridines, N-vinyl pyrrolidone and N-vinyl imidazolium salts, such as N-vinyl-N-methylimidazolium chloride and N-vinyl-N-methylimidazolium methosulfate. Other suitable high polymers are, for example, saturated linear polyesters which contain recurring carboxylic esters groups in the chain and which have been produced in conventional manner, for example polyethylene glycol terephthalate, polyurethanes, particularly polycondensation products of hexamethylene diisocyanate and alkanediols having from 2 to 6 carbon atoms, such as glycol and hexandiol-1,6, synthetic linear polyamides having recurring units of the general formula —CO—NH— in the chain molecules, for example poly-$\epsilon$-caprolactam, polylaurolactam and polycondensation products of aliphatic dicarboxylic acids such as adipic acid or suberic acid, and aliphatic diamines such as hexamethylene diamine, decamethylene diamine and 4,4'-diaminodicyclohexylmethane, polyvinyl alcohols and their modified products, poly-1,2-alkylene oxides, particularly polyethylene oxide and poly-1,2-propylene oxides, polyacetals such as polyformaldehyde, and polycarbonates, polyureas, cellulose esters and cellulose ethers, particularly cellulose. The polymers and polycondensates of the above kind may be manufactured in conventional manner and may be in solution or dispersion. It is advantageous to use solution or emulsion polymers, for example in the form of solutions or dispersions as produced during their manufacture. Alternatively, solutions or dispersions may be used which have been prepared from the polymers or polycondensates for example from polyethylene, synthetic polyamides, polyalkylene oxides or polyformaldehydes. In the manufacture of the polymer dispersions by emulsion polymerization or of the so-called dispersions, conventional dispersing agents and protective colloids may be used, suitable examples of which have been given above.

Of particular interest are polymer dispersions such as are conventionally used as binders, particularly binders for non-woven fabrics. Particularly advantageous dispersions based on homo- and co-polymers of acrylic and/or methacrylic acid derivatives, such as acrylates and/or methacrylates with alcohols of from 1 to 8 and in particular from 1 to 4 carbon atoms, with cycloalkanols of 5 of 6 carbon atoms in the ring or with polyhydric, in particular di- or tri-hydric, alcohols of from 2 to 6 carbon atoms, also of acrylamides and/or methacrylamides or their N-methylol compounds of their N-methylol ethers of alcohols of from 1 to 4 carbon atoms. Suitable examples are homo- and/or co-polymers of methyl, ethyl, n-propyl, n-butyl, isobutyl, n-hexyl, 2-ethylhexyl and cyclohexyl esters of acrylic and methacrylic acids, of 2-hydroxyethyl acrylate, 1-4-butanediol monoacrylate, acrylamide, methacrylamide, N-methylol acrylamide, N-methylol acrylamide methyl ether and N-methylol methacrylamide b-butyl ether. Also advantageous are aqueous polymer emulsions based on copolymers with other usual comonomers, such as styrene, which emulsions contain at least 40% by weight of the above acrylic or methacrylic derivatives. Also advantageous are polymer emulsions based in copolymers of butadiene or on vinyl ester, particularly those of carboxylic acids having from 2 to 4 carbon atoms.

Of interest are dispersions of styrene homo- and co-polymers, polyisobutylene, synthetic polyamides, polyurethanes and of polyvinyl pyrrolidone.

It is particularly advantageous to use homo- or co-polymers of acrylic and methacrylic acids or copolymers of maleic acid with, say, styrene, as carboxyl groups may be introduced into the poromeric materials in this manner.

The concentration of polymers of the above kinds in the monomer solutions of dispersions may be varied within wide limits. It is generally between 0.1 and 30% and preferably between 2 and 20% by weight, based on the total weight of the solution or dispersion containing the monomers and polymers. The ratio of monomers to polymers, by weight, is generally in the range 0.5 to 10:1 and advantageously from 3 to 8:1.

The solutions or dispersions of monomers and polymers may advantageously also contain small amounts of photoinitiators, i.e. compounds which disintegrate into free radicals under the action of light or which produce free radicals as a result of reactions caused by light, which free radicals then initiate polymerization. Examples of suitable photoinitiators are vicinal ketaldonyl compounds, such as diacetyl and benzil, α-ketaldonyl alcohols, such as benzoin, acyloin ethers, such as benzoin isopropyl ether, and α-substituted aromatic acyloins, such as α-methyl benzoin, aromatic ketones and aldehydes, such as benzophenone, propiophenone and benzaldehyde. The photoinitiators are generally added in amounts of from 0.001 to 10% and preferably from 0.01 to 3% by weight, based on the monomers. Inorganic photosensitizers which disintegrate into radicals or produce free radicals under the action of light, are also suitable, for example uranyl salts, optionally in admixture with perioxides such as hydrogen perioxide and potassium persulfate.

Irradiation of the solidified crystalline web assembly for polymerization of the monomers is effected with electromagnetic radiation having a wavelength of less than 0.70 $\mu$m and advantageously less than 0.39 $\mu$m or with electron beams. Suitable radiation, for example, is that from mercury vapor lamps, xenon lamps or fluorescent tubes. Daylight or sunlight may also be used. Exposure times of some minutes are usually necessary to polymerize the monomers. For example, exposure times of from 2 to 30 minutes and in particular from 5 to 15 minutes have been successfully used when irradiating with ultraviolet light. The exposure time required may be readily determined by simple experiment. If high-energy radiation is used, for example light having a wavelength of less than 0.3 $\mu$m, the presence of photoinitiators is no longer necessary. However, photoinitiators must be included when irradiation is carried out with light in the visible and ultraviolet regions of the spectrum at wavelength which are longer than those corresponding to the absorption spectra of the materials to be polymerized. Conveniently, the frozen structure is cooled during polymerization in order to remove the heat of polymerization.

It is important that polymerization of the monomers takes place by irradiation in the presence of finely divided crystals of the liquid. During polymerization, the monomers and, optionally, polymers are present in a specific arrangement determined by the crystallization of the liquid contained in the monomer solution or dispersion. Thus the process involves polymerization of monomers on a crystalline matrix, i.e. in a specific crystalline structure-former. Those points at which the crystals of frozen liquid in the frozen monomer solution or dispersion are present during polymerization of the monomers will subsequently form the pores of the poromeric material.

The conversion rate achieved by polymerization byirradiation is generally between 60 and 100% by weight, based on the monomers.

Following the photopolymerization, the frozen web structure is heated to cause the crystals to melt. The resulting poromeric web materials are then removed from the substrate and separated from the liquid and any residual monomers and high polymers, washed if necessary and then dried.

For further information on the method of making the poromeric materials, reference is made to U.K. Patent 1,235,146; U.S. Pat. No. 3,607,692 and German Patent Application P 22 02 568.9.

The efficiency of the poromeric materials depends not only on their content of carboxyl groups but also on the type of natural or synthetic fibers incorporated therein. In a preferred embodiment, fibers of polyolefins, e.g. polyethylene or in particular polypropylene, are used. Poromeric materials made with these fibers have the added advantage that a portion of the dirt dispersed in the wash liquor is deposited onto the fibers. This prevents deposition of the dirt onto any polyamide or polyester fibers present in the textiles being washed, so that graying of the laundered material is suppressed.

The poromeric materials are conveniently used in the form of cloths which are placed in the washing machine together with the soiled textiles to be washed and remain therein until the conclusion of the washing process. The washing program of some washing machines includes a rinsing period at the commencement of washing, during which the loosely attached soil is removed from the soiled textiles before detergents are added. The advantageous properties of our poromeric materials are effective even in this first stage, i.e. before any other detergent or auxiliaries have been added.

The amount of poromeric material to be used in order to achieve good washing results depends on the number of active carboxylate groups present per unit of weight of the poromeric material and also on the amount and degree of soiling of the textiles to be washed and on the hardness and amount of water used. Where hard water is used, it is convenient to select a quantity of poromeric material such that the residual hardness of the water is not more than 6° German scale (equivalent to 60 mg of CaO/l) and is preferably from 0.5 to 4° German scale (5 to 40 mg CaO/l). It is possible to use an excess of poromeric materials but this is not generally necessary.

Our washing process may be carried out in the presence or absence of soluble phosphates. If phosphates are used, the amount thereof may be reduced as compared with that used in conventional washing processes, the reduction of said amount being dependent on the calcium-binding properties of the poromeric material added. The phosphate content of the wash liquor, which is normally from 1.5 to 3.5 g/l, may be reduced to less than 1.5 g/l, e.g. to from 0.1 to 1 g/l, when our poromeric material is used, However, excellent washing results are achieved, particularly in the absence of surface-active agents, even if no water-soluble phosphate is present.

We have found, surprisingly, that the above poromeric materials are not only capable of binding the hardness salts in the water but, like phosphates, also greatly assist the washing processes, as they themselves have a considerable washing action, as demonstrated below with reference to tests.

Since the poromeric materials used in the process of the invention are not only effective as hardness-salt binders but also have a washing effect of their own in the absence of conventional detergents, they may also be used advantageously when washing is carried out with water which is naturally very solt or has been presoftened.

Preferably, the process of the invention is carried out in the presence of conventional detergents or detergent auxiliaries including, in particular, surfactants, soil carriers, bleaches, optical brighteners, enzymes, inorganic salts and sequestering agents.

Suitable surfactants are those of the sulfonate or sulfate types, for example alkylbenzene sulfonates, in particular n-dodecylbenzene sulfonate, olefin sulfonates, alkyl sulfonates and -sulfofatty acid esters, primary and secondary alkyl sulfates and the sulfates of ethoxylated alcohols of higher molecular weights. Also useful are the sulfated partial ethers and partial esters of polyhydric alcohols such as the alkali metal salts of monoalkyl ethers or monofatty acid esters of glycerol monosulfuric acid ester or of 1,2-dioxypropanesulfonic acid. Also suitable are sulfates of ethoxylated fatty acid amides and alkyl phenols and also fatty acid taurides and fatty acid isethionates.

Other suitable anionic surface active agents are alkali metal soaps of fatty acids of natural or synthetic origin, e.g. the sodium soaps of coconut, palm kernel and tallow fatty acids. Suitable zwitter-ionic surface active agents are alkylbentaines and, in particular, alkylsulfobetaines, e.g. 3-(N,N-dimethyl-N-alkylammonium)propane-1-sulfonates and 3-(N,N-dimethyl-N-alkylammonium)-2-hydroxy-propane-1-sulfonates.

The anionic surface active agents may be in the form of sodium, potassium and ammonium salts and the salts of organic bases such as mono-, di and tri-ethanolamines. If the said anionic and zwitter-ionic compounds possess an aliphatic hydrocarbon radical, this should preferably be linear and have from 8 to 22 carbon atoms. In the compounds having an araliphatic hydrocarbon radical, the preferably unbranched alkyl chains should contain from 6 to 16 carbon atoms on average.

Suitable non-ionic surface active agents are primarily polyglycol ether derivatives of alcohols, fatty acids and alkyl phenols, which contain from 3 to 30 glycol ether groups and from 8 to 20 carbon atoms in the hydrocarbon radical. Particularly suitable are polyglycol ether derivatives in which the number of ethylene glycol ether groups is from 5 to 15 and their hydrocarbon radicals are derived from linear, primary alcohols of from 12 to 18 carbon atoms or from alkyl phenols containing a straight-chain $C_{6-14}$ alkyl group.

Other suitable non-ionic surface active substances are the water-soluble adducts of ethylene oxide and polypropylene glycol, ethylenediamino polypropylene glycol and alkyl polypropylene glycols with $C_{1-10}$ alkyl radicals, which adducts contain from 20 to 250 ethylene glycol ether groups and from 10 to 100 propylene glycol ether groups. The said compounds usually contain from 1 to 5 ethylene glycol units per propylene glycol unit. Also useful are non-ionic compounds of the amino-oxide and sulfoxide types, which may also be ethoxylated if desired.

To improve the soil-carrying properties, the detergents may contain graying inhibitors or soil dispersers. These include water-soluble polyionic polymers such as the alkali metal salts of carboxymethyl cellulose, polyacrylic acid and copolymers thereof, and of polyesters and polyamides available from tri- or tetra-carboxylic acids and diols, diamines or N-alkyldialknolamines and containing free carboxyl groups capable of forming salts, and also the alkali metal salts of polymeric sulfonic acids, e.g. of polyvinyl sulfonic acids, polyesters and polyamides of sulfosuccinic acid, sulfonated phenol/formaldehyde condensates, or of polyesters derived from dicarboxylic acids and N-alkyldialkanolamines and which have been made water-soluble by reaction with sultones or halo-alkanesulfonic acids.

Other suitable soil dispersers are non-ionic water-soluble or water-dispersible polymers such as methyl cellulose, hydroxyethyl cellulose, ethoxylated starch, polyvinyl alcohol, partially saponified polyvinyl acetate, polyvinyl pyrrolidone, polyglycol, polyacrylamide and polyethylene imine and partially alkylated polyethylene imines or polyethylene imines which have been reacted with substoichiometric amounts of dicarboxylic acids. Copolymers of the above vinyl compounds with each other or with ethylene, styrene or vinyl ethers have also been proposed.

Other suitable components are oxygen-donating bleaches such as alkali metal perborates, percarbonates, perpyrophosphates and persilicates and also urea perhydrate. We prefer to use sodium perborate tetrahydrate. For stabilization of the percompounds, the detergents may contain magnesium silicate, for example in amounts of from 3 to 20% by weight based on the amount of perborate. In the case of detergents for use in washing textiles at temperatures below 70°C, these may contain bleaching activators, in particular tetraacetyl glycol urile or tetra-acetyl ethylene diamine in the form of powders. The particles of powder consisting of bleaicining activator or of per-compound may be coated with a sheating substance such as water-soluble polymers or fatty acids in order to prevent interaction between the per-compound and the activator during storage.

The detergents may also contain enzymes of the protease, lipase and amylase types or mixtures thereof. Such enzymes may be of animal or vegetable origin, e.g. produced with the aid of digestive ferments or yeasts. Preferably, the active enzymatic ingredients used are used as have been obtained from bacteria or fungi such as *bacillus subtilis* and *streptomyces griseus*, these being relatively resistant to alkalis, per-compounds and anionic surface active substances and remaining virtually inactivated up to temperature of between 50° and 70°C.

The detergents may also contain optical brighteners, in particular derivatives of diaminostilbene disulfonic acid or their alkali metal salts having the formula:

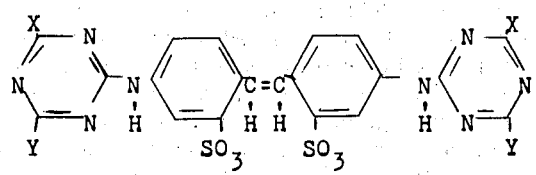

in which X and Y may be the same or different and denote $NH_2$, $NH-CH_3$, $NH-CH_2-CH_2OH$, $CH_3-N-CH_2-CH_2OH$, $N(CH_2-CH_2OH)$, morpholino, dimethylmorpholino, $NH-C_6H_5$, $NH-C_6H_5$, $NH-C_6H_4-SO_3H$, $OCH_3$ and $Cl$. Particularly suitable are those compounds in which X is anilino and Y is diethanolamino or morpholino.

Also suitable are optical brighteners which are capable of brightening synthetic fibers, for example 1,2-diphenylpyrazolines, in which the phenyl radicals may contain other substituents such as hydroxy, alkoxy, hydroxyalkyl, amino, alkylamino, acylamino, carboxyl, carboxyalkyl, sulfo and sulfamido groups or halogen atoms. As examples there may be mentioned 1-(p-sulfamidophenyl)-3-(p-chlorophenyl)pyrazoline and 1-(p-carboxymethylphenyl)-3-(p-chlorophenyl) pyrazoline. Other suitable whiteners are those of the naphtotriazolestilbene sulfate, ethylene-bis-benzimidazole, ethylene-bis-benzoxazole, thiophene-bis-benzoxazole, dialkylaminocumarine and cyanoanthracene types. Mixtures of the above optical brighteners may be used if desired.

Suitable inorganic builders are primarily washing alkalis such as alkali metal silicates, in particular sodium silicate, in which the ratio of $Na_2O$ to $SiO_2$ is from 1:1.35 to 2:1, and also carbonates, bicarbonates and borates of sodium or potassium. Where a certain amount of phosphate is acceptable, it is also possible for condensed alkali metal phosphates, in particular pentasodium triphosphate or mixtures thereof with di- and tetra-phosphates, to be present. The detergents may also contain sequestering agents known to stabilize components such as optical brighteners and perfumes which are susceptible to oxidation.

These agents include the alkali metal and ammonium salts of nitrilotriacetic acid, ethylenediaminotetraacetic acid, diethylenetriaminopentaa-acetic acid and the higher homologs of said aminopolycarboxylic acids. Suitable homologs may be made, for example, by polymerizing an ester, amide or nitrile of N-acetic acid aziridine followed by saponification to a carboxylate or by reacting polyamines having a molecular weight of from 500 to 100,000 with chloroacetates or bromoacetates under alkaline conditions. Other suitable aminopolycarboxylic acids are polymeric ethylene imines N-substituted with succinic acid, tricarballylic acid or butanetrioic acid groups, these being obtainable in a manner similar to the N-acetic acid derivatives. Useful phosphorus sequestering agents are the alkali salts of aminopolyphosphoric acids, in particular amino-tri(-methylenephosphoric acid), ethylenediaminotetra(methylenephosphonic acid), 1-hydroxyethane-1,1-diphosphonic acid, methylenediphosphonic acid, ethylenediphosphonic acid and the higher homologs of said polyphosphonic acids. Mixtures of said sequestering agents may also be used.

To render the detergents more agreeable to the skin and to improve their foaming properties, fatty acid alkylolamides, particularly $C_{12-18}$ fatty acid mono- and di-ethanolamides may be incorporated therein. Detergents for use in drum washing machines contain instead well-known antifoaming agents such as saturated fatty acids or their alkali metal salts having from 20 to 24 carbon atoms or triazine derivatives, e.g. trialkyl melamines or propoxylated or butoxylated melamines and paraffins and high molecular weight fatty acid esters or triglycerides.

Other components which may be present in the detergents are neutralizing salts, particularly sodium sulfate, bacteriostatic substances such as halogenated phenol ethers and phenol thioethers, halogenated carbanilides and alicylanilides and halaogenated diphenyl methanes, and also dyes and perfumes.

The detergents may be in liquid or solid form, for example in the form of spray-dried powders, granules or pellets. Their combination with the poromeric materials may be effected in any desired manner. For example, the poromeric materials may be packed together with the detergents either as single large pieces or as a number of smaller portions. The poromeric materials may be provided with markings corresponding to specific amounts of detergent, thus enabling the user to employ the correct amounts of poromeric material. Finally, the poromeric material may be made up into bags or sacks into which the detergent is filled. These bags may be given a size of capacity which provides a calcium-binding power and an amount of detergent packed therein sufficient for one wash, for example for one washing machine charge. In such a case, if the bag is closed with a seam sewn with a water-soluble thread or stuck with a water-soluble adhesive, the entire package may be placed in the wash water or in the washing machine, thus facilitating handling considerably. In another embodiment, the washing operation may be carried out with poromeric materials which have been impregnated with detergent.

The calcium-binding power of the poromeric materials is not exhausted on completion of the washing operation, particularly if used in an amount suitable for achieving a low residual hardness of the wash liquor. These materials are thus capable of softening the rinsing water at least partially and of thus combating the deposit of hardness salts on the washed textiles, so-called fiber encrustation. This is to be regarded as an additional advantage of the invention.

The spent poromeric materials laden with calcium or magnesium ions are capable of further use. For example, they may be used as domestic dish-cloths, in which case their residual complexing power has a favorable effect on their cleansing action. Being harmless to the environment, they may be placed in trash cans. They are particularly advantageously burnt in refuse incinerators in that apart from carbon dioxide and water they produce only calcium and magnesium oxide or carbonate. These combustion products are desirable in incinerators, however, since they bind the hydrogen chloride produced during combustion of polyvinyl chloride.

In the following Examples the parts and percentages are by weight. Water hardness in given in ° German scale.

EXAMPLE 1

A. Preparation of a poromeric material suitable as cation exchanger 2.1 parts of acrylic acid are dissolved in 30 parts of water, and 0.14 parts of sulfonated castor oil (40% in water) is added and 0.8 part of 1,4-butanediol diacrylate containing 0.035 part of benzoin methyl ether in solution is emulsified therein. There are then added 1.5 parts of a 40% aqueous dispersion of a copolymer of 85% of n-butyl acrylate, 7% of acrylic acid, 5% of N-methylolacrylamide and 3% of 1,4-butanediol diacrylate. 2.1 parts of a needle-punched, spunbonded polypropylene web weighing about 100 g/m² are then impregnated with the mixture. The assembly is then applied to an endless metal belt cooled to −15°C and carrying a 0.3 mm thick layer of a frozen crystalline solution of 5 parts of an adduct of 40 moles of ethylene oxide and 1 mole of castor oil in 95 parts of water, whereupon the web assembly is frozen to a crystalline mass by cooling to −20°C. The assembly is then irradiated for 10 minutes with Philips Black Light lamps TL 40W/0.8 positioned at a distance of 25 cm from the web. After irradiation, the frozen assembly is thawed out. The resulting poromeric material is then washed with water and dried at 60°C in a stream of air. The poromeric material is obtained in a yield of 95% (based on monomers and polymer used). The calculated total capacitly of carboxyl groups is 5.3 mg-equivalents/g. The resulting poromeric material is treated for 15 minutes at 25°C with excess 6% soda solution in order to convert the carboxyl groups to carboxylate, and is then rinsed with distilled water. The calcium-binding power, as determined by the method described above, is 73 mg CaO/g.

B. Washing test

This Example demonstrates that when the poromeric materials are used along, i.e. without the addition of conventional detergents or detergent auxiliaries, considerable soil removal is achieved simply by washing with water. To this end, 3 portions of lightly soiled households textiles, each portion weighing 4 kg, were placed in a washing machine containing 20 l of wash liquid, in three separate washing operations. To each portion there were added 3 pieces of test cotton fabric measuring 15 × 15 cm and artificially soiled with dust and skin-grease. The addition of this highly soiled test fabric raised the amount of dirt contained in the total liquor to that of 4 kg of moderately soiled household textiles.

The following washing liquors were used, these having been adjusted to pH 10 by the addition of a few drops of dilute caustic soda solution:
a. tap water having a hardness of 16°,
b. tap water having a hardness of 16° and containing 5 g/l of the poromeric material described under A above, this being sufficient to reduce the hardness of the water to 1.8°,
c. tap water having a hardness of 16° and containing 1.2 g/l of tripolyphosphate giving an equivalent CaO-binding effect.

Washing was carried out for 45 minutes at a temperature of 90°C, after which the textiles were rinsed 3 times and then dried and tested for cleanliness. The textiles washed in the presence of the poromeric material showed the same degree of cleanliness as those washed with the tripolyphosphate solution. This was apparent both on the lightly soiled household textiles and, to and even greater extent, on the test fabircs added.

C. Washing test

Following the procedure described above, i.e. using 20 l of water having a hardness of 16° for a period of 45 minutes at 90°C, 2 portions, each weighing 4 kg, of lightly soiled household textiles were washing using two different detergents (a) and (b) of the following compositions:

| (a) % | (b) % | |
|---|---|---|
| 7.1 | 7.1 | sodium dodecylbenzenesulfonate |
| 2.4 | 2.4 | fatty alcohol polyglycol ether (C$_{12-18}$ alkyl, 10 EO) |
| 3.2 | 3.2 | soap (tallow:coconut 10:1) |
| 0.0 | 40.0 | pentasodium triphosphate |
| 3.5 | 3.5 | Na$_2$ . 3.3 SiO$_2$ |
| 24.0 | 24.0 | sodium perborate |
| 51.1 | 11.1 | Na$_2$SO$_4$ |
| 1.5 | 1.5 | sodium carboxymethylcellulose |
| 0.3 | 0.3 | EDTA (Na salt) |
| to 100 | to 100 | water |

The detergents were used in a concentration of 5 g/l. In the case of the detergent not containing triphosphate, the amount of poromeric material used was sufficient to bind the hardness salts in the water (16°) and in the soiled textiles (4°) so as to give a final liquor hardness of 2°. To this end, it was necessary to use 120 g of poromeric material as prepared under (A) above.

The tests showed that the textiles washed in the presence of the poromeric material but in the absence of phosphate had the same degree of cleanliness as the textiles washed with the detergent containing phosphate.

D. Washing test

A laboratory washing machine (Launder-O-meter) containing 10 standard stainless steel spheres was used to wash textiles specimens soiled with dust and skin-grease and consisting of cotton (specimen I) and finished cotton (specimen II), using water of various degrees of hardness. The liquor ratio (ratio of weight of liquor to weight of material treated) was 12:1. The following additions were made:
a. 5 g/l of poromeric material as made under (A) above,
b. 10 g/l of poromeric material as made under (A) above,
c. 2.0 g/l of pentasodium triphosphate,
d. 2.0 g/l of sodium sulfate,
e. 1.1 g/l of ion exchanger "DOWEX" 50 WX 10,
f. 2.2 g/l of ion exchanger "DOWEX" 50 WX 10.

Batches (a), (b), (d), (e) and (f) were adjusted to pH 10 with dilute caustic soda solution. The ion exchanger consisted of a sulfonated polystyrene/divinyl benzene copolymer (degree of crosslinking 8%) having a capacity of 140 mg CaO/g).

Washing was carried out for 30 minutes at 90°C following a heating-up period of 15 minutes. The washed textiles were rinsed 3 times with tap water and then spin-dried, dried and tested for cleanliness. Photometrically determined reflectantce values are listed in Table 1 below. These show that the poromeric materials used in the present invention are much more effective than the commercial ion exchanger of equivalent calcium-binding power and that they have the same cleansing action as triphosphate.

TABLE 1

| Specimen | Additive | % Reflectance at a water hardness of | | |
|---|---|---|---|---|
| | | 5° | 16° | 32° |
| I | — | 57.5 | 56.5 | 57.7 |
| | a | 72.9 | 68.3 | 64.5 |
| | b | 74.4 | 77.4 | 71.0 |
| | c | 76.8 | 74.6 | 69.9 |
| | d | 59.5 | 59.4 | 57.2 |
| | e | — | 55.5 | — |
| | f | — | 57.5 | — |
| II | — | 45.3 | 44.9 | 44.5 |
| | a | 58.6 | 55.8 | 50.5 |
| | b | 64.3 | 66.1 | 63.4 |
| | c | 63.1 | 61.2 | 54.2 |
| | d | 46.1 | 46.3 | 45.3 |
| | e | — | 44.7 | — |
| | f | — | 44.3 | — |

E. Washing test

Using the laboratory washing machine as used in washing test (D) above, test fabrics of cotton (specimen I) and high-quality finished cotton (specimen II), both soiled with dust and skin-grease, were washed using a detergent of the following composition:

```
parts
7.1    sodium dodecylbenzenesulfonate
2.4    fatty alcohol polyglycol ether
       (C_{13-18} alkyl, 10 EO)
3.2    soap (tallow:coconut 10:1)
3.5    Na_2O . 3.3 SiO_2
24.0   sodium perborate
11.1   Na_2SO_4
1.5    sodium carboxymethylcellulose
0.3    EDTA (Na salt)
```

The hardness of the wash water was 16°. Calcium-binding was effected by adding various amounts of pentasodium triphosphate or the poromeric material described under (A) above to the wash liquor. The washing temperature was 90°C and washing was carried out for 45 minutes, of which 15 minutes were necessary for heating up the water. The concentration of detergent was 3 g/l and 5 g/l and the liquor ratio was 10:1. The results of photometric reflectance values (averages of 10 measurements) are listed in Table 2 below.

These show that the washing activity of the poromeric material is equal to and in some cases superior to that of triphosphate.

TABLE 2

| Specimen | Conc. of detergent g/l | Poromeric material g | % Reflectance at $Na_5P_3O_{10}$ additions (in parts by weight) of | | | | |
|---|---|---|---|---|---|---|---|
| | | | 0 | 5 | 10 | 20 | 40 |
| I | 3 | — | 49.2 | — | — | — | 74.2 |
| | | 0.25 | 65.3 | 69.6 | 72.1 | 74.9 | — |
| | | 0.5 | 71.8 | 74.1 | 75.5 | 75.9 | — |
| | | 1.0 | 76.1 | 76.6 | 75.9 | 76.4 | — |
| | 5 | — | 56.1 | — | — | — | 77.8 |
| | | 0.25 | 75.3 | 77.0 | 77.3 | 77.2 | — |
| | | 0.5 | 77.4 | 77.2 | 78.0 | 77.5 | — |
| | | 1.0 | 77.4 | 77.4 | 78.9 | 78.1 | — |
| II | 3 | — | 43.1 | — | — | — | 63.0 |
| | | 0.25 | 51.3 | 51.1 | 52.2 | 59.5 | — |
| | | 0.5 | 56.5 | 61.6 | 65.0 | 68.5 | — |
| | | 1.0 | 65.5 | 72.9 | 73.7 | 75.7 | — |

F. Washing test

In a domestic drum-type washing machine there were washed, in each of a series of tests, 3.5 kg of clean household textiles together with 2 cotton test fabrics having the dimensions 20 × 20 cm and soiled with skin-grease and street dust (reflectance 85.0%) using water having a hardness of 20° and detergents of the compositions given below with and without the addition of poromeric material as described under (A).

The detergents were used in a concentration of 7.5 g/l. The amount of poromeric material added was sufficient to reduce the hardness of the water to 2.9° by binding the hardness salts present in the water and in the textiles. The amount of poromeric material required to achieve this end was 120 g. The reflectance of the test fabrics was measured in a photoelectric photometer under a blue filter. The compositions of the detergents in % w/w and the reflectance values measured are given in the following Table.

TABLE 3

Composition of detergents used (water content approx. 7%) and reflectance values of washed test fabrics

| | a | b | c | d | e |
|---|---|---|---|---|---|
| Sodium dodecylbenzenesulfonate | 7.0 | 7.0 | 7.0 | 7.0 | 7.0 |
| Soap | 3.0 | 3.0 | 3.0 | 3.0 | 3.0 |
| Oleyl alcohol with 10 EO | 3.0 | 3.0 | 3.0 | 3.0 | 3.0 |
| $Na_2O . 3.3 SiO_2$ | 4.0 | 4.0 | 4.0 | 4.0 | 4.0 |
| Tripolyphosphate | 40.0 | 5.0 | 5.0 | 0.0 | 0.0 |
| Perborate | 25.0 | 25.0 | 25.0 | 25.0 | 25.0 |
| EDTA | 0.2 | 0.2 | 0.2 | 0.2 | 0.2 |
| CMC | 1.0 | 1.0 | 1.0 | 1.0 | 1.0 |
| $Na_2SO_4$ plus water (inert components) | to 100% in each case | | | | |
| Poromeric material | no | yes | no | yes | no |
| Reflectance value | 78% | 79.5% | 72.0% | 78.5% | 65% |

When the test fabrics were washed under the above conditions but without the addition of detergent, i.e. with tap water only, the reflectance found was 42%.

EXAMPLES 2 to 6

PREPARATION OF CATION EXCHANGERS

EXAMPLE 2

Example 1 is repeated except that 0.6 part of ethylene glycol diacrylate is used in place of 0.8 part of butanediol-1,4 diacrylate and 2.6 parts of acrylic acid are used in place of 2.1 parts of acrylic acid. The dispersion mentioned in Example 1 is replaced by 0.75 part of a 40% dispersion of a copolymer of 50 parts of n-butyl acrylate, 45 parts of styrene and 5 parts of acrylic acid. The web structure used consists of 1.3 parts of polypropylene non-woven web having a weight of 100 g/m².

The yield of polymer is 99% (based on monomers and polymers used). This gives a calculated total capacity of carboxyl groups of 7.4 mg-equivalents/g.

EXAMPLE 3

2 parts of a polyester/polyamide blended non-woven web weighing 85 g/m² are impregnated with a solution of 1 part of triethylene glycol diacrylate, 2.5 parts of acrylic acid and 0.05 part of benzoin isopropyl ether in 30 parts of glacial acetic acid in a trough equipped with cooling means. The assembly is then cooled to −15°C and caused to freeze. It is then irradiated for 10 minutes with 2 commercial mercury high-pressure lamps (Philips H1K 125) arranges at a distance of 45 cm from the web structure. The trough is then warmed and the melted solvent is removed by squeezing and washing with water. After air-drying, there is obtained a cation exchanger having a calculated total capacity of 5.5 milli-equivalents of carboxyl groups per gram. The yield of polymer is 71%.

EXAMPLE 4

2.6 parts of methacrylic acid are dissolved in 30 parts of water, and 0.15 part of sulfonated castor oil (40% in water) is added, whereupon 0.6 part of butanediol-1,4 diacrylate containing 0,035 part of benzoin isopropylene dissolved therein is emulsified in the mixture. There is then added 0.75 part of the dispersion described in Example 1. In a trough equipped with cooling means, 2.5 parts of a polyester/polyamide blended non-woven fabric weighing 110 g/m² are impregnated with the above mixture and then treated as described in Example 3. There is obtained a poromeric material having 4.6 milli-equivalents of carboxyl groups per gram, the yield of polymer being 83% (based on monomers and polymer used).

EXAMPLE 5

0.14 part of sulfonated castor oil (40% in water) and 1.2 parts of a polyacrylic acid (K value 30) are dissolved in 30 parts of water, and a solution of 0.035 parts of benzoin isopropyl ether in 2.3 parts of acrylic acid is stirred in. This mixture is used to impregnate 2.1 parts of needle-punched polypropylene web weighing 120 g/m² in a trough equipped with cooling means. Further treatment is as described in Example 3. There is obtained a fine-pore material having a calculated total capacity of carboxyl groups of 8.3 milli-equivalents/g, the yield of polymer being 89%.

EXAMPLE 6

0.6 part of a copolymer of maleic anhydride and vinyl acetate is dissolved in 7 parts of 0.1N caustic soda solution and 13 parts of water together with 0.04 part of sulfonated castor oil (40% w/w in water). 0.8 part of butanediol-1,4 diacrylate containing 0.05 part of benzoin methyl ether dissolved therein is then dispersed in the solution. 2.1 part of acrylic acid dissolved in 10 parts of water are then added and the resulting mixture is used to impregnate 1.3 parts of a rayon staple web weighing 95 g/m² in a trough equipped with cooling means. Further treatment is as described in Example 3. There is obtained an ion exchanger having a total capacity of carboxyl groups of about 5 milli-equivalents per gram, the yield of polymer being 65% (based on monomers and polymer used).

Practical test

Each of the above exchangers are held in a 5% aqueous soda solution for 20 minutes at 25°C to convert them to the sodium form, after which they are washed with desalted water and dried. The tests B, C, D, E and F as described in Example 1 are carried out with these specimens. On account of the different carboxyl group contents, different amounts of poromeric material are required for the individual tests. The following Table lists the amounts required of each material in each test to give results comparable with those achieved by the material produced in Example 1. For purposes of comparison, the amounts used in Example are also listed. The results obtained are the same as those achieved in Example 1.

TABLE 4

| Poromeric material of Example | Amounts of poromeric material required for | | | |
|---|---|---|---|---|
| | B (g/l) | D (g) | E (g) | F (g) |
| 1 | 5 | 120 | 0.5/1.0 | 0.25/0.5/0.1 | 120 |
| 2 | 4.5 | 107 | 0.45/0.9 | 0.23/0.45/0.9 | 107 |
| 3 | 5 | 120 | 0.5/1.0 | 0.25/0.5/1.0 | 120 |
| 4 | 6 | 14P | 0.6/1.2 | 0.30.6/1.2 | 14P |
| 5 | 4 | 100 | 0.4/0.8 | 0.2/0.4/0.8 | 100 |
| 6 | 4.5 | 108 | 0.45/0.9 | 0.23/0.45/0.9 | 108 |

EXAMPLES 7 to 10

The following washing tests were carried out on "easy-care" textiles of finished cotton or of synthetic fibers using a domestic washing machine wich horizontally mounted drum (MIELE Automatic 421). This machine operates at 95°C by the "single-liquor process", i.e. after the detergent has been added and without any soaking or prewashing period, the wash liquor is heated to 95°C over about 20 minutes and then held at that temperature for 15 minutes while the textiles are mechanically agitated by the rotating drum. The wash liquor is then diluted to about 3 times its volume by the addition of tap water and this diluted liquor is pumped off after a short residence time. Rinsing is then effected 4 times using tap water, this water being removed by spin-drying after the 2nd and 4th rinses.

Synthetics are washed at 60°C in a similar manner but using larger quantities of liquor and reduced mechanical agitation of the textiles. The heat-up period is 20 minutes and the washing period is 15 minutes at 60°C, the addition of water and the 4 rinses being carried out without intermediate spin-drying.

The following detergent (recipe f) is used in a concentration of 7.5 g/l (IN — iodine number, EO — ethylene oxide combined by addition, EDTA — ethylenediamino tetra-acetate, CMC — carboxymethyl cellulose):

| | % w/w |
|---|---|
| tallow alcohol (IN 45) plus 10 EO | 6.5 |
| soap (coconut:tallow 1:1) | 2.0 |
| sodium behenate | 1.0 |
| waterglass ($Na_2O:SiO_2$ 1:3.3) | 10.0 |
| EDTA | 0.3 |
| Na-CMC | 1.6 |
| Magnesium silicate | 2.0 |
| sodium perborate | 30.0 |
| sodium (anhydrous) | 30.0 |

| | |
|---|---|
| water | 16.6 |

There were also used 3 g/l and 6 g/l of the poromeric material prepared as described in Example 1.

The textiles to be washed consisted of cotton (test series A), high-quality finished cotton (wash and wear finish) (test series B) and a blend of polyester and high-quality dressed cotton (test series C). In each washing test at 95°C the amount of textiles washed was 4 kg, and in each test at 60°C the amount was 1 kg. The liquor ratio was 5:1 for the 95°C wash and 30:1 for the 60°C wash.

Determinations of the degrees of whiteness gave the results listed in the following Table. For the purposes of comparison, the resuslts achieved when using a phosphate-containing commercial detergent (example 1, recipe a) are also given. All results are averages of 4 individual tests). These results show that the poromeric material effects an improvement in whiteness in virtually all cases, i.e. that its washing action is superior to that of a high-quality commercial detergent.

TABLE 5

| Ex. | Detergent | Washing temp. °C | Textile A | Whiteness Textile B | Textile C |
|---|---|---|---|---|---|
| — | f alone | 95 | 74 | 67 | 68 |
| 7 | f with 3g/l of exchanger | | 76 | 67 | 75 |
| 8 | f with 5g/l of exchanger | | 81 | 71 | 75 |
| | a (comparison) | | 75 | 63 | 72 |
| — | f alone | 60 | 62 | 60 | 59 |
| 9 | f with 3g/l of exchanger | | 64 | 62 | 61 |
| 10 | f with 5g/l of exchanger | | 64 | 63 | 62 |
| | a (comparison) | | 65 | 56 | 58 |

We claim:

1. A process for washing textiles in the presence of a water insoluble cation exchanger which comprises washing textile articles in a body of water containing hardness ions and having therein a piece of fibrous poromeric material serving as a cation exchanger for water hardness ions, said poromeric material having been made by a process comprising the steps of:

A. impregnating a fibrous web structure with a liquid containing (1) a monomer mixture of at least 0.1% w/w of a polyethylenically unsaturated polymerizable monomer having at least two double bonds, which monomer can be polymerized by free radicals, with one or more monoethylenically unsaturated, copolymerizable monomers, said last mentioned monomers including a member selected from the group consisting of acrylic acid, methacrylic acid and maleic acid, (2) both said monomer mixture (1) and a polymer having a molecular weight of more than 10,000 in liquid solution or liquid dispersion, said polymer being a homopolymer or copolymer of a member selected from the group consisting of acrylic acid, methacrylic acid and maleic acid, or (3) both acrylic acid and polyacrylic acid, the total amount of the acrylic acid, methacrylic acid or maleic acid in said monomers and polymers of (1), (2) or (3) being an amount sufficient to provide in said poromeric material at least one milli-equivalent of carboxyl groups per gram of poromeric material, B. cooling the resulting impregnated web structure to a temperature at which at least 50% w/w of the liquid used to impregnate said web structure solidifies by freezing thereof, C. irradiating the resulting frozen web structure of step (B) with either electromagnetic irradiation having a wavelength of less than 0.70 μm or with electron beams to cause polymerization of said monomers in the frozen composition.

D. then melting the resultant frozen liquid in the solidified structure to produce a poromeric polymer composition containing said liquid, E. separating the poromeric material from said liquid and drying said poromeric material and F. converting the carboxyl groups of the acrylic acid, methacrylic acid or maleic acid units in said poromeric material to alkali metal salt carboxylate groups.

2. A process as claimed in claim 1 wherein the water used for said washing contains less than 1.5 g/l of water soluble phosphate.

3. A process as claimed in claim 1 wherein the amount of said acrylic acid, methacrylic acid or maleic acid used in step (A) is sufficient to provide in the resultant poromeric material about 20–70% w/w of polymerized units of said acrylic acid, methacrylic acid or maleic acid.

4. A process as claimed in claim 3 wherein said fibrous web structure constitutes about 20–60% by weight of the resultant poromeric material.

5. A process as claimed in claim 1 wherein the units of acrylic acid, methacrylic acid or maleic acid in the resultant poromeric material are an amount sufficient to provide 2.5–8 milli-equivalents of carboxyl groups per gram of said poromeric material.

* * * * *